UNITED STATES PATENT OFFICE.

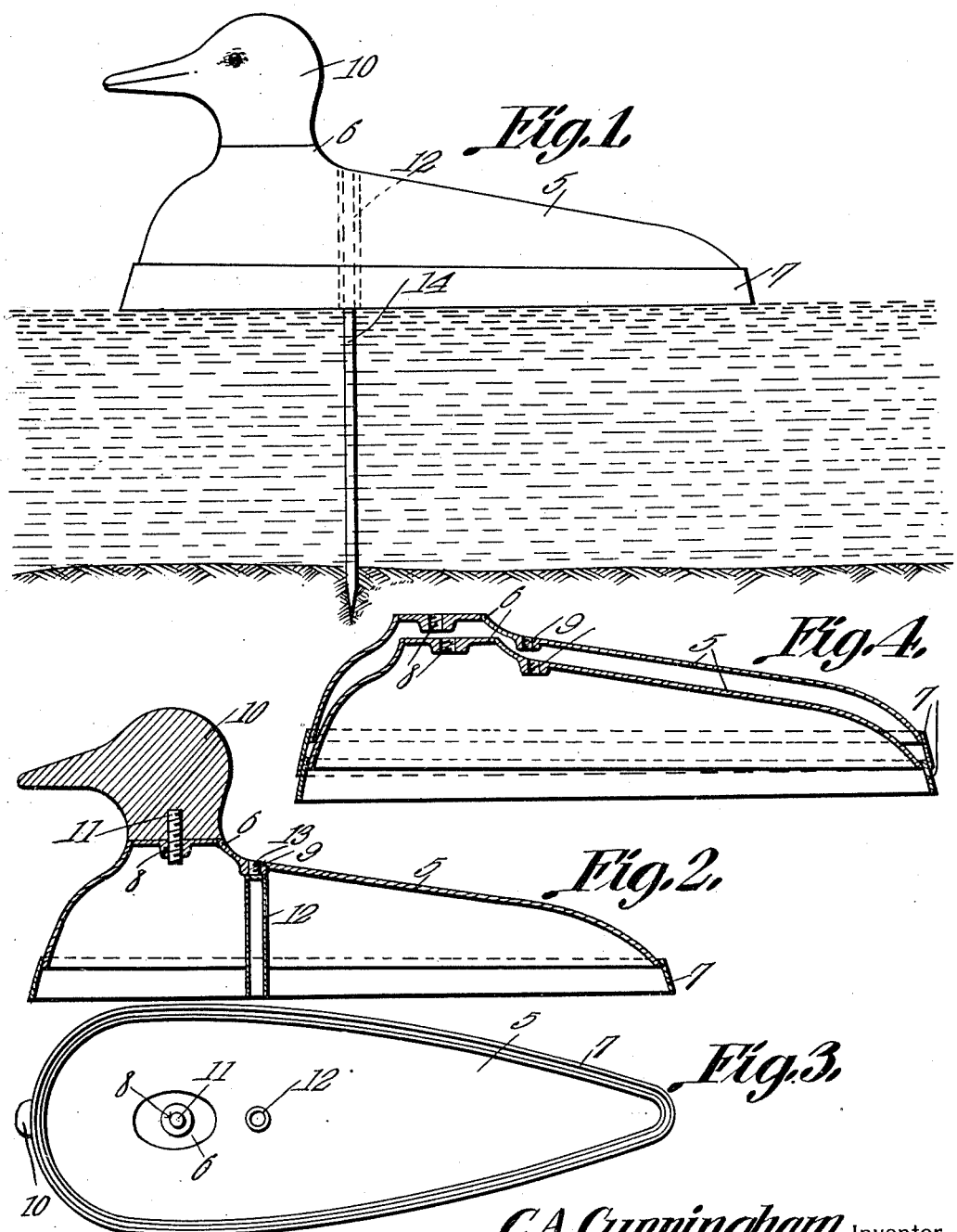

CHARLES A. CUNNINGHAM, OF CHICO, CALIFORNIA.

DECOY.

1,066,587.  Specification of Letters Patent.  Patented July 8, 1913.

Application filed May 31, 1912. Serial No. 700,743.

*To all whom it may concern:*

Be it known that I, CHARLES A. CUNNINGHAM, a citizen of the United States, residing at Chico, in the county of Butte and State of California, have invented a new and useful Decoy, of which the following is a specification.

This invention relates to decoys, such as are particularly designed to float or which are buoyant, and is particularly an improvement over the decoy disclosed in my former Patent #957,750, issued May 10, 1910.

The present invention contemplates the provision of a simple and light decoy which is buoyant, and which when not in use may be compactly nested with other like decoys, so that any number of the decoys may be compactly transported within a small compass, for purposes of shipment or conveyance by the sportsman.

With the foregoing and other objects in view, which will be apparent as the invention is better understood, the present invention resides in the novel construction and combination of parts hereinafter set forth and particularly pointed out in the appended claims, it being understood that this device is susceptible of alterations or deviations in its details within the scope of the appended claims without departing from the spirit of the invention.

The preferred embodiment of the invention has been illustrated in the accompanying drawing, wherein like reference characters have been employed to denote corresponding parts and wherein—

Figure 1 is a side elevation of the decoy as in use. Fig. 2 is a vertical longitudinal section thereof. Fig. 3 is a bottom view of the decoy. Fig. 4 is a longitudinal vertical section showing how the backs of two decoys are nested.

Referring specifically to the drawings, the back 5 of the present decoy is hollow and is preferably stamped from sheet metal or other suitable material, and has a boss 6 struck upwardly at the neck portion of the back. A continuous upwardly tapering flange 7 is secured, by soldering or otherwise, around the edges of the back 5. The boss 6 is provided with a threaded aperture 8 and the back 5 is provided with a threaded aperture 9 directly in rear of the boss 6.

The head 10 is preferably solid and is provided with a threaded stem or projection 11 which is adapted to engage the threaded aperture 8 of the boss 6 in order to attach the head to the back 5. This head 10 is therefore detachable from the back 5.

A sleeve or socket 12 has a threaded stem or projection 13 at its upper end, which is designed to engage the threaded aperture 9 so that the sleeve or socket 12 depends interiorly from the back 5. This sleeve or socket 12 is designed for the reception of the upper end of a spud or stick 14, which may be driven into the bed of the stream, pond, or for the like, where the decoy is to be positioned. The spud 14 and the sleeve 12 being telescopically engaged permit the decoy to vibrate due to waves, or due to winds blowing against the decoy.

The back and head of the decoy may be suitably painted or otherwise ornamented to simulate a duck, or other fowl, so as to attract fowl or birds of a like character in the vicinity thereof as is common in duck hunting.

In use, the back 5 being in the form of an inverted pan is designed to float on the water, and the decoy will serve for the purposes to which decoys of this character are designed, and which are well known to the sportsman.

It is customary to employ a number of these decoys in hunting, and when the decoys are to be stored or transported, the same may be compactly nested or contained within a small compass. This is accomplished by detaching the heads of the various decoys from the backs thereof, and the backs are then permitted to nest together, it being understood that the sleeves or sockets 12 have been removed. When the backs of the various decoys are nested together, the flanges 7 are designed to fit snugly, one over the other, so as to hold the backs of the various decoys out of contact to permit the various backs to assume the compact and rigid relation with each other when nested. The backs thus nested may be placed in the case or other container, and the heads 10, sockets 12 and other implements or articles may be placed in the remaining space.

The present decoy is light, and simple, as well as inexpensive in construction, and it is apparent that a number of the decoys may be readily nested for transportation or storage. It will be further noted that there is no limit to the number of decoys which may be nested together, and by reference to the patent aforementioned, it will be noted that the present decoy requires but one-half the space of the decoy disclosed in the said patent. As a whole, the present decoy provides serviceable and desirable articles of this character.

Having thus described the invention, what is claimed as new is:—

1. A decoy comprising a hollow back stamped from sheet metal and adapted to be nested with similar parts of like decoys, an upwardly tapering flange secured around the edges of the back, so that the flanges of the nested parts fit snugly one over the other to hold the backs out of contact, and a head detachably engaged to the back.

2. A decoy comprising a hollow back adapted to be nested with similar parts of like decoys, a head detachably engaged to the back, and two members in sliding engagement, one being detachably engaged to the back and the other being designed to engage the bed of a body of water so as to position the decoy and permit the same to vibrate.

3. A decoy comprising a hollow back stamped from sheet metal adapted to be nested with similar parts of like decoys, and having a boss struck upwardly from the neck portion, the boss being provided with a threaded aperture, an upwardly tapering flange secured around the edges of the back, so that the flanges of the nested parts fit snugly one over the other to hold the backs out of contact, and a head having a threaded stem engageable in the said threaded aperture of the boss.

4. A decoy comprising a hollow back stamped from sheet metal having a boss struck upwardly from the neck portion and having a threaded aperture directly in rear of the boss, the boss having a threaded aperture, an upwardly tapering flange secured around the edges of the back, a head having a threaded stem engageable with the threaded aperture of the boss, and a socket having a threaded stem at its upper end engageable with the other aperture.

5. A decoy comprising a hollow back stamped from sheet metal and adapted to be nested with similar parts of like decoys, an upwardly tapering flange secured around the edges of the back, so that the flanges of the nested parts may fit snugly one over the other to hold the backs out of contact, a head detachably engaged to the back, a socket detachably engaged at its upper end to the back, and a member telescoping into the socket and designed to engage the bed of a body of water.

In testimony that I claim the foregoing as my own, I have hereto affixed my signature in the presence of two witnesses.

CHARLES A. CUNNINGHAM.

Witnesses:
W. J. COSTAR,
J. D. MARCH.

---

Copies of this patent may be obtained for five cents each, by addressing the "Commissioner of Patents, Washington, D. C."